(12) United States Patent
Liet

(10) Patent No.: US 12,004,489 B2
(45) Date of Patent: Jun. 11, 2024

(54) FODDER MIXING WAGON

(71) Applicant: Trioliet B.V., Oldenzaal (NL)

(72) Inventor: Robert Jan Liet, Oldenzaal (NL)

(73) Assignee: Trioliet B.V., Oldenzaal (NL)

( * ) Notice: Subject to any disclaimer, the term of this patent is extended or adjusted under 35 U.S.C. 154(b) by 729 days.

(21) Appl. No.: 17/096,848

(22) Filed: Nov. 12, 2020

(65) Prior Publication Data

US 2021/0144959 A1    May 20, 2021

(30) Foreign Application Priority Data

Nov. 19, 2019   (DE) ...................... 20 2019 106 424.2

(51) Int. Cl.
*A01K 5/00* (2006.01)
*A23N 17/00* (2006.01)
(Continued)

(52) U.S. Cl.
CPC ............ *A01K 5/004* (2013.01); *A23N 17/007* (2013.01); *B01F 33/5023* (2022.01); *B01F 35/2205* (2022.01); *B01F 2101/18* (2022.01)

(58) Field of Classification Search
CPC .... A23N 17/007; A01K 5/004; B01F 33/5023
See application file for complete search history.

(56) References Cited

U.S. PATENT DOCUMENTS

| | | | |
|---|---|---|---|
| 2007/0191075 A1 | 7/2007 | Greene et al. | ................ 455/572 |
| 2008/0004777 A1* | 1/2008 | Quigley | .................. B28C 5/422 |
| | | | 701/50 |

(Continued)

FOREIGN PATENT DOCUMENTS

| | | |
|---|---|---|
| CA | 2843302 | 8/2014 |
| CA | 2982026 | 6/2018 |

(Continued)

OTHER PUBLICATIONS

Office Action dated Mar. 8, 2022 in the counterpart Canadian application No. 3,095,640, 7 pages.

(Continued)

*Primary Examiner* — Anshu Bhatia
(74) *Attorney, Agent, or Firm* — Fattibene & Fattibene, LLC; Paul A. Fattibne

(57) ABSTRACT

Fodder mixing wagon with a mixing container and at least one mixing member arranged rotatable therein for fodder components and a sensor system arranged to co-rotate on the mixing member for examining at least one of the fodder components and/or a fodder mixture formed therefrom. A data transmission system with a transmitter a receiver which are associated with one another in a co-rotating and not co-rotating arrangement for wireless data transmission to and/or from the sensor system; and/or an electrical generator for supplying power to the sensor system. The transmitter and receiver are arranged such that the wireless data transmission is within the mixing container; and the generator is arranged on the stator side to co-rotate with the mixing member and on the rotor side is coupled not to co-rotate. Data transmission is provided with a low transmission power. Inductive data and power transmission may be used.

13 Claims, 9 Drawing Sheets

(51) Int. Cl.
    *B01F 33/502*     (2022.01)
    *B01F 35/22*     (2022.01)
    *B01F 101/18*     (2022.01)

(56) References Cited

U.S. PATENT DOCUMENTS

| | | | |
|---|---|---|---|
| 2009/0133634 A1 | 5/2009 | Axelsson et al. | 119/14.08 |
| 2010/0263345 A1 | 10/2010 | Goldenberg et al. | 56/10.2 R |
| 2010/0326363 A1 | 12/2010 | Van Den Berg | 119/57.92 |
| 2014/0230737 A1 | 8/2014 | Hendricus | 119/57.92 |
| 2018/0069746 A1 | 3/2018 | Dieke et al. | H04L 29/12 |
| 2018/0160718 A1* | 6/2018 | Liet | A23N 17/007 |
| 2021/0360900 A1 | 11/2021 | Karwacki et al. | A01K 5/0275 |

FOREIGN PATENT DOCUMENTS

| | | |
|---|---|---|
| DE | 10245001 | 4/2003 |
| DE | 102010033886 | 2/2012 |
| DE | 202016106837 | 3/2018 |
| NL | 2017472 | 3/2018 |
| WO | WO 2009060442 | 5/2009 |
| WO | WO 2019035756 | 2/2019 |

OTHER PUBLICATIONS

Search Report dated Oct. 30, 2020 in the counterpart European application No. 20186685.2, 2 pages.

* cited by examiner

FODDER MIXING WAGON

FIELD OF THE INVENTION

The invention relates generally to a fodder mixing wagon for mixing and examining fodder components and more particularly to a sensor with wireless data transmission and providing power to the sensor and data transmission system.

BACKGROUND OF THE INVENTION

A generic fodder mixing wagon is known from DE 20 2016 106 837 U1. The generic fodder mixing wagon is, for example, a fodder mixing wagon that is pulled by way of a drawbar or is self-propelled, the mixing container of which is filled consecutively with at least two fodder components and in which at least one rotatable mixing member ensures that the fodder components are mixed to form a fodder mixture.

During the production of the fodder mixture, the composition and/or the properties of individual fodder components are monitored by way of an optical NIR sensor system which is preferably arranged on the mixing auger. The measurement data produced is then transmitted wirelessly via a radio link to a control device of the fodder mixing wagon. After wireless data transmission, the measurement data can also be analyzed and evaluated outside the fodder mixing wagon, for example, by data storage and/or evaluation in a cloud or a smartphone. Data evaluated in this manner can then be used to specifically control the fodder mixing wagon when further fodder components are added and mixed.

However, the radio transmission from the sensor system arranged inside the mixing container to the control device of the fodder mixing wagon arranged outside the mixing container and possibly onward to a smartphone communicating therewith has shown to be problematic. For example, the radio transmission must also operate reliably through the comparatively sturdy walls of the fodder mixing container, for which relatively high transmission power is required depending on the arrangement and filling level of the mixing container. In addition, controlling the sensor system co-rotating in the mixing container on the mixing member from the exterior would be desirable.

There is therefore a need for fodder mixer wagons that are improved in this regard.

SUMMARY OF THE INVENTION

The object posed is satisfied with a fodder mixing wagon according to an embodiment of the invention wherein a transmitter and receiver are arranged such that a wireless data transmission therebetween takes place predominantly within a mixing container. According thereto, the fodder mixing wagon comprises a mixing container and at least one mixing member arranged to rotate therein for mixing fodder components, and at least one sensor system arranged to co-rotate on the mixing member for examining at least one of the fodder components and/or a fodder mixture formed therefrom. Furthermore, the fodder mixing wagon comprises a data transmission system with at least one receiver and at least one transmitter which are associated with one another in a co-rotating and not co-rotating arrangement for wireless data transmission to and/or away from the sensor system.

According to the invention, the receiver and the transmitter are arranged such that the wireless data transmission therebetween takes place predominantly and in particular entirely within the mixing container.

This enables reliable data transmission with comparatively low transmission power between the co-rotating sensor system and a data interface within the mixing container that is stationary in the sense of "not co-rotating". As a result, the data transmission between the co-rotating and stationary system components can be simplified and configured to be more flexible, in particular also for bidirectional data transmission.

Components that do not co-rotate are also referred to below as stationary for better readability. The term "stationary" therefore only refers to the rotatability of the mixing member relative to the fodder mixing wagon as a whole.

With regard to data transmission, the terms "wireless" and "contactless" are to be understood as synonyms which respectively presupposes the inclusion of a wireless/contactless transmission path between the transmitter and the receiver. This can be understood in the sense of a transmission path through a substantially electrically insulating and/or directionally non-specific conductive medium, such as air, fodder components or the like.

Of course, the transmitters and receivers comprise internal wiring and can comprise, for example, transmitter coils, receiver coils and/or antennas.

A data transmission that is located predominantly and in particular entirely within the mixing container is to be understood to mean that more than half, preferably more than 90%, of the wireless transmission path between the respective transmitter and the receiver is within the mixing container. For this purpose, transmitters/receivers that are stationary with respect to the fodder mixing wagon can be arranged on the inner wall of the mixing container, in its wall, and/or on its outer wall. For example, the wall of the mixing container in the region of stationary transmitters/receivers can be made of a material that is suitable for wireless data transmission.

This facilitates in particular wireless data transmission toward the sensor system arranged to co-rotate, which would otherwise require a comparatively high transmission power outside the mixing container or contacting data transmission using slip rings that are maintenance-prone. Control commands, control data or the like can be transmitted according to the invention to the co-rotating sensor system both efficiently and reliably.

The fodder mixing wagon preferably further comprises a power transmission system with at least one transmitter coil and at least one receiver coil for inductively resonant power transmission to the sensor system. The sensor system can then be supplied with electrical power in a wireless/contactless manner. This makes obsolete the need for contacting power transmission to the sensor system with the associated disadvantages of mechanical wear on the transmitting contacts and their maintenance with extensive assembly work.

The transmitter coil is then arranged in a stationary manner in the sense of not co-rotating on the fodder mixing wagon, while the receiver coil is co-rotating on the mixing member. The inductively resonant power transmission is particularly efficient through air gaps of up to 10 mm between the transmitter coil and the receiver coil by suitable frequency adjustment. In this way, electrical supply power can be transmitted, for example, from the battery to the sensor system without wear. Suitable for this are also locations on the fodder mixing wagon that would be accessible only with great effort for maintenance work, such as the region of a stationary bearing tube of the mixing member.

Alternatively, the power transmission system can also comprise slip rings and runners for contacting electrical power transmission to the sensor system. Contacting power transmission is conceivable in particular in locations that are relatively easily accessible for maintenance work.

In a further advantageous embodiment, the fodder mixing wagon comprises an electrical generator for supplying power to the sensor system, where the generator is arranged on the stator side to co-rotate with the mixing member and, opposite thereto on the rotor side is coupled not to co-rotate, for example, to the mixing container, a stationary bearing tube or another stationary, i.e. not co-rotating structure of the fodder mixing wagon.

A generator arranged to co-rotate with the mixing member on the stator side is relatively easy to wire to the sensor system. The rotor of the generator can then roll along a stationary circular path, for example, by use of a friction wheel. This enables the sensor system to be supplied with power when the mixing member is rotating without a power source being carried along stationarily on the fodder mixing wagon.

The transmitter(s) and the receiver(s) of the data transmission system is/are preferably configured for contactless bidirectional data transmission by way of inductive coupling. Such data transmission is also possible bidirectionally, for example, by modulating the alternating field generated by the transmitter coil of the power transmission system.

Such an inductive coupling, for example, via an air gap of up to 10 mm, can be implemented comparatively easily between a stationary component of the mixing member, for example a stationary bearing tube, and a component of the mixing member co-rotating therewithin, for example, a core tube carrying a mixing coil.

The core tube can then shield the wireless/contactless transmission path from the fodder mixture produced in the mixing container in order to thus ensure consistently good transmission properties and to minimize mechanical interference. Data such as, for example, evaluated measured values, analysis data calculated in the sensor system and/or parameters derived therefrom, can in this way be reliably transmitted from the sensor system to a control device configured on the fodder mixing wagon, as well as control commands, measurement parameters or the like from the control system to the co-rotating sensor system.

The data transmission system is preferably configured such that it uses the transmitter coil and the receiver coil of the power transmission system for at least unidirectional, in particular bidirectional data transmission by modulating an alternating field generated by the transmitter coil. This enables a particularly efficient configuration in which the data transmission system is integrated into the power transmission system completely or at least for one direction of transmission. The electronic circuits of the data transmission system required for modulation can then also be integrated into co-rotating and/or stationary circuit components of the power transmission system.

In a further advantageous embodiment of the fodder mixing wagon, the transmitters and receivers are configured for contactless bidirectional data transmission by way of radio signals, in particular, following the Bluetooth protocol. This enables particularly flexible positioning of the transmitter and the receiver, in particular, in the case of wireless transmission paths of at least 10 mm in length. For example, stationary transmitters/receivers can be arranged selectively in regions of the mixing container in which they are protected against mechanical stresses when the fodder mixture is produced.

The fodder mixing wagon preferably further comprises a control system with a controller area network or CAN bus and at least one CAN interface for connecting the wireless data transmission system to the CAN bus. Measurement data and/or analysis data from the sensor system calculated therefrom as well as measurement parameters, control commands or the like can then be transmitted bidirectionally from the associated control device, which is arranged not to co-rotate, by way of standardized CAN messages and can thus also be made available to any participants on the CAN bus.

The described power supply of the co-rotating sensor system from a stationary power source, such as, for example, a battery carried along on the fodder mixing wagon or on an associated tractor, generally requires the effort of a contactless or contacting transmission between components that move relative to one another. In principle, it would be desirable to avoid the technical effort required for this.

This object is satisfied with a fodder mixing wagon according to another embodiment. This accordingly comprises a mixing container and at least one mixing member for fodder components which is arranged rotatable therein and at least one sensor system which is arranged to co-rotate on the mixing member for examining at least one of the fodder components and/or a fodder mixture formed therefrom. Furthermore, the fodder mixing wagon then comprises an electrical generator for supplying power to the sensor system.

According to the invention, the generator is arranged on the stator side to co-rotate with the mixing member and on the rotor side, on the other hand, is coupled not to co-rotate, for example to the mixing container, a stationary bearing tube of the mixing member or the like, or a stationary structure. This enables comparatively simple wiring between the generator and the sensor system on the co-rotating mixing member. There is then no need to transmit power between the stationary, i.e. not co-rotating, and the co-rotating components of the fodder mixing wagon.

The generator is preferably a friction wheel dynamo rolling along a non-stationary component of the fodder mixing wagon or a hub dynamo. The housing of a friction wheel dynamo can be fastened comparatively easily and easily accessible to co-rotating components of the mixing member, for example, to a section of the core tube or the like. The friction wheel of the generator can then roll, for example, on a circular path along a stationary bearing tube for the mixing member.

A hub dynamo could be arranged, for example, between a drive shaft of the mixing member and a stationary bearing tube arranged coaxially between the drive shaft and the core tube of the mixing member. This would be practical in particular in an upper end section of the drive shaft/mixing member. Such a power supply for the sensor system is particularly robust.

Furthermore, the fodder mixing wagon comprises a data transmission system with at least one receiver and at least one transmitter which are associated with one another in a co-rotating and not co-rotating arrangement for wireless data transmission to and/or away from the sensor system and are arranged in such a way that the wireless data transmission therebetween takes place predominantly and in particular entirely within the mixing container.

The advantages mentioned with respect to the prior embodiment are then additionally given.

The transmitters and the receivers are preferably configured for contactless bidirectional data transmission by way of inductive coupling.

In a further advantageous configuration of the fodder mixing wagon, the transmitters and receivers are configured for contactless bidirectional data transmission by way of radio signals, in particular, following the Bluetooth protocol.

In particular in the case of a fodder mixing wagon with a generator arranged to co-rotate, the data transmission system can comprise slip rings and runners which are associated with one another in a not co-rotating and co-rotating arrangement for contacting data transmission to and/or away from the sensor system.

BRIEF DESCRIPTION OF THE DRAWINGS

Preferred embodiments of the invention are shown in the drawings, where.

DETAILED DESCRIPTION OF THE INVENTION

Figure 1:
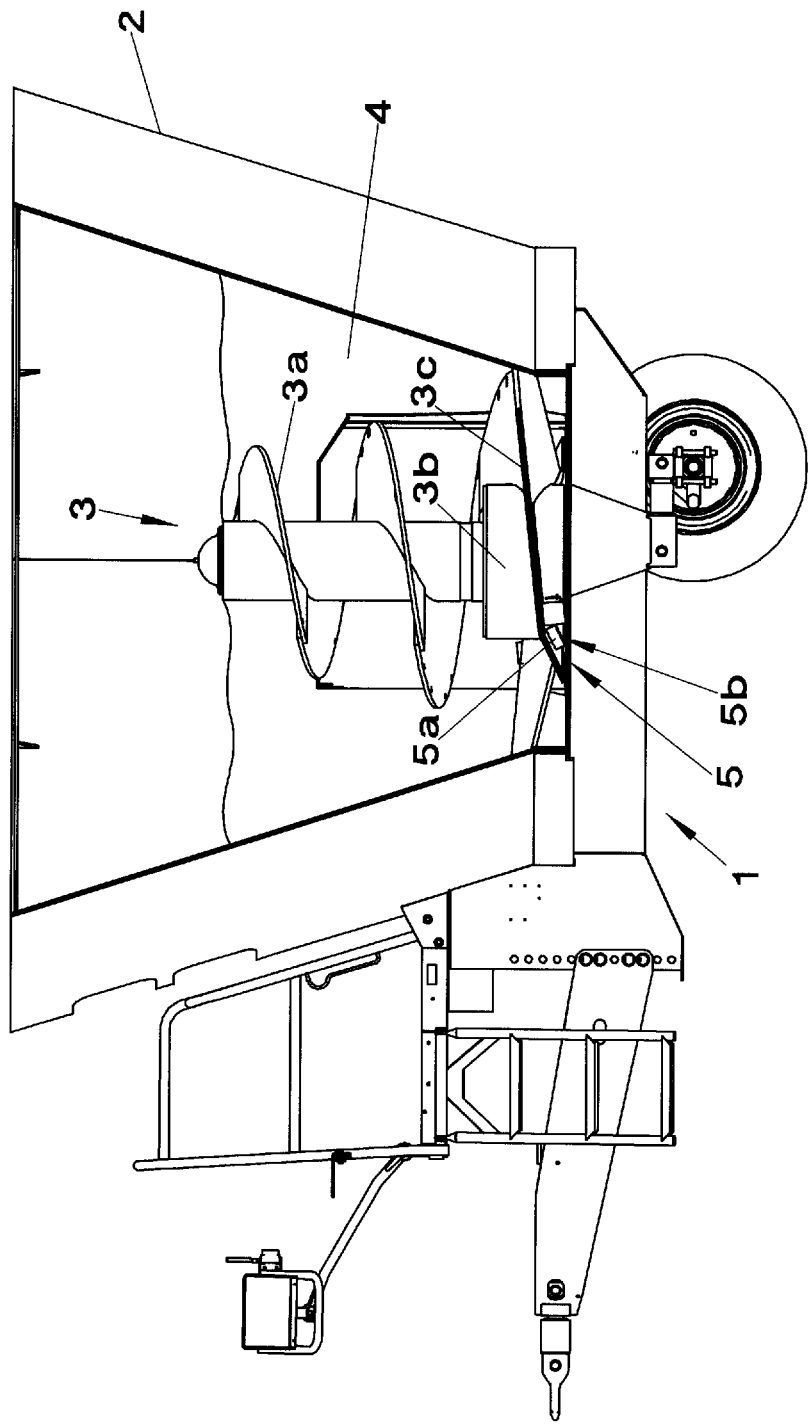
FIG. 1 shows a partial longitudinal sectional view through a fodder mixing wagon.

As can be seen from FIG. 1, fodder mixing wagon 1 can have generally known structural features with regard to its general configuration and the shape of a mixing container 2 present thereon, which shall therefore not be discussed any further.

At least one rotatable mixing member 3 for producing a fodder mixture 4 from fodder components supplied consecutively is arranged in mixing container 2. At least one sensor system 5 for examining the fodder components and/or fodder mixture 4 formed therefrom is arranged to co-rotate on mixing member 3.

Mixing member 3 is preferably a mixing auger rotatable about a vertical axis with at least one helix 3a, a core tube 3b, and at least one mounting plate 3c for sensor system 5 arranged in the lower end region of mixing member 3.

Sensor system 5 comprises at least one preferably optical sensor 5a which operates in particular in the near infrared (NIR) range, and an electronic processing unit 5b for processing measurement data from sensor 5a, so that analysis data relating to examined fodder mixture 4 can already be calculated by sensor system 5 from the measurement data. Sensor 5a (only indicated schematically) can be arranged, for example, behind a suitably transparent window on mounting plate 3c and can thus be protected against mechanical damage during the production of fodder mixture 4.

Figure 2:
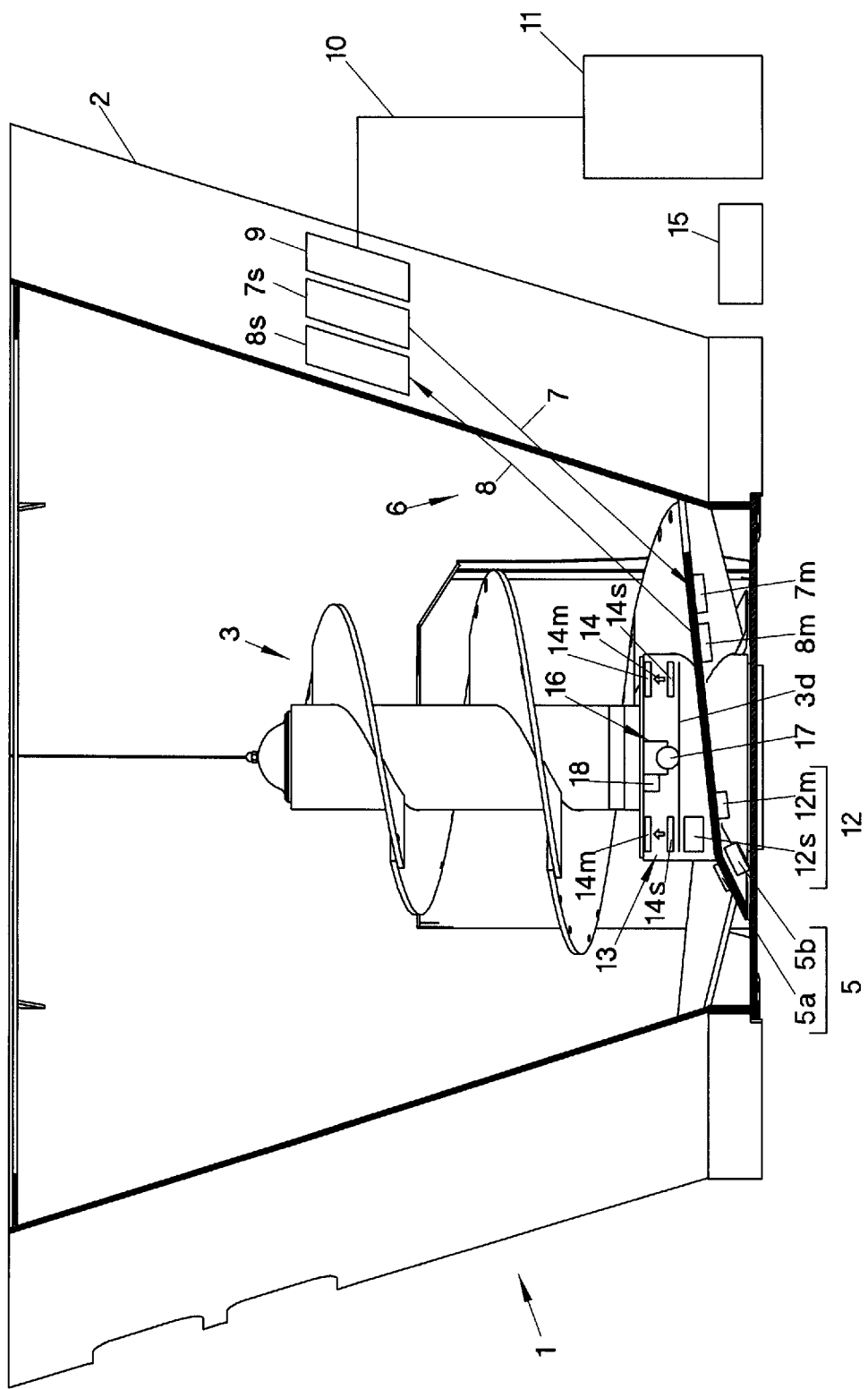
FIG. 2 shows a schematic illustration of a wireless data transmission system and a wireless power transmission system.

As indicated in FIG. 2 in a partially schematic view, fodder mixing wagon 1 in the region of mixing container 2 comprises, for example, a radio-supported data transmission system 6 with a stationary transmitter 7s and an associated co-rotating receiver 7m for data transmission 7 to sensor system 5 as well as with a co-rotating transmitter 8m and an associated stationary receiver 8s for opposite data transmission 8 away from sensor system 5. Data transmission 7, 8 by radio is by definition wireless and contactless, respectively.

Processing unit 5b of sensor system 5 can be wired to co-rotating transmitter 8m and co-rotating receiver 7m in a manner basically known. With the co-rotating components of data transmission system 6, measurement data processed in processing unit 5b can be sent wirelessly and control data for sensor system 5 and/or measurement parameters to be adjusted in sensor system 5 can be received wirelessly.

Control data, measurement parameters and measurement data can be transmitted as CAN messages, for example, via an associated CAN interface 9 by way of CAN bus 10 from or to a control device 11 of fodder mixing wagon 1. Control device 11 can be part of a weighing system for mixing container 2 or another control system of fodder mixing wagon 1.

Stationary transmitter 7s and stationary receiver 8s are arranged in the region of mixing container 2 in such a way that the distances of contactless/wireless data transmission 7 to co-rotating receiver 7m and contactless/wireless data transmission 8 away from co-rotating transmitter 8m are largely, in particular, at least by 90%, and particularly preferably substantially entirely within mixing container 2.

For this purpose, stationary transmitter 7s and receiver 8s are preferably arranged within mixing container 2, but in principle can also be arranged at least in part in the wall thereof and/or outside mixing container 2, for example, in the region of a wall section which is sufficiently penetrable for radio transmission.

Suitable for wireless/contactless data transmission 7, 8 is a radio connection using the Bluetooth protocol in accordance with various WIFI standards or the like.

Wireless data transmission 7, 8 is also possible over distances of up to 10 mm, for example, by inductive coupling.

A data transmission system 12 based on this principle can advantageously be integrated, for example, into a power transmission system 13 for inductively resonant power transmission 14. Inductive power transmission system 13 supplies co-rotating sensor system 5 with electrical power from a power source that is carried along with the fodder mixing wagon 1 in a not co-rotating manner, and possibly also further co-rotating electronic circuits.

Such a combination of an inductively operating power transmission system 13 and an inductively operating data transmission system 12 is referred to below for the sake of simplicity as data and power transmission system 12, 13.

In principle, inductive data transmission 7, 8 can be carried out separately from inductive power transmission 14, at least unidirectionally but also in terms of equipment, i.e. with transmission systems operating independently of one another, each of which comprises its own transmitter and receiver coils (not shown).

Inductive power transmission system 13 or combined data and power transmission system 12, 13 comprises a stationary transmitter coil 14s and a receiver coil 14m arranged to co-rotate for contactless power transmission 14 by way of an alternating magnetic field.

The alternating field generated by transmitter coil 14s can additionally be modulated by integrated data transmission system 12 or combined data and power transmission system 12, 13 in order to effect unidirectional or bidirectional data transmission 7, 8 by way of modulated inductive coupling.

For this purpose, inductive data and power transmission system 12, 13 comprises, for example, a transmitter 12*m* arranged to co-rotate which modulates the alternating field generated by stationary transmitter coil 14*s* by way of co-rotating receiver coil 14*m* of data and power transmission system 12, 13, and stationary receiver 12*s* connected to stationary transmitter coil 14*s* of data and power transmission system 12, 13 for the corresponding demodulation.

By modulating the alternating field generated by stationary transmitter coil 14*s* and subsequent demodulation, however, contactless data transmission 7, 8 is also possible in the opposite direction (not shown).

Accordingly, inductive data transmission system 12 can be integrated into data and power transmission system 12, 13 for unidirectional data transmission 7, 8 in any direction or for bidirectional data transmission 7, 8.

It would also be conceivable that the alternating field of transmitter coil 14*s* is modulated only for unidirectional data transmission 7, 8, and that a separate inductive data transmission system 12 is present for the respective other direction of transmission and has a separate pair of coils for contactless data transmission 7, 8 by way of inductive coupling.

Inductively coupled data transmission 7, 8 in the region of data and power transmission system 12, 13 is not shown separately in FIG. 2 for the sake of clarity.

The electrical supply power can be provided as direct current by a battery 15 that is preferably carried along in an associated tractor but possibly also on the fodder mixing wagon 1 itself. The direct current is converted into alternating current, for example, having a frequency of 100 to 300 kHz, in a manner known in principle in the stationary circuit part (not shown) of power transmission system 13. Transmitter coil 14*s* generates an alternating field therefrom which is converted back to alternating current in receiver coil 14*m*, depending on the resonance coupling present. It flows through the co-rotating circuit part (not shown) of power transmission system 13 or data and power transmission system 12, 13 and is rectified there.

Air gaps which are easy to structurally implement of, for example, up to 10 mm are possible between stationary transmitter coil 14*s* and co-rotating receiver coil 14*m*. For the sake of clarity, this is not shown to scale in FIG. 2.

Figure 4A:
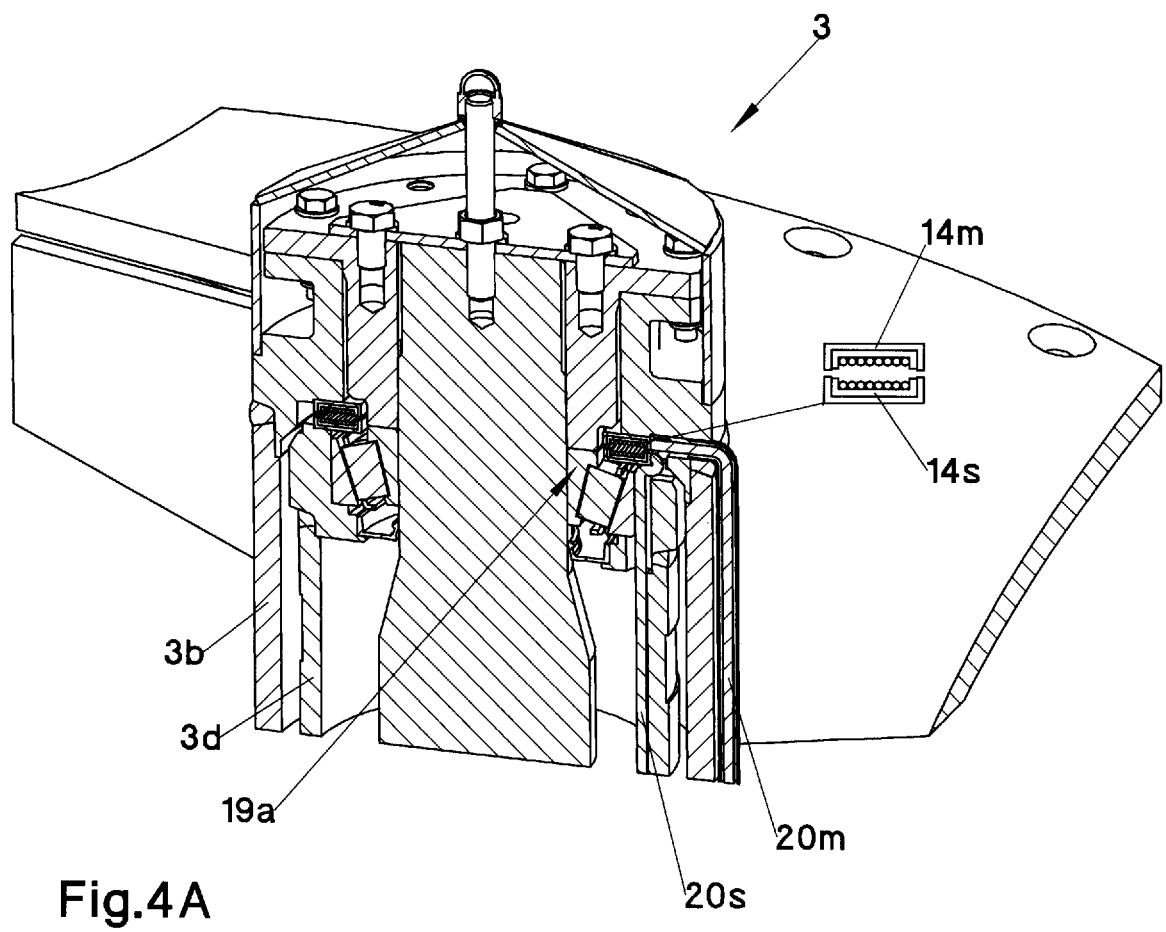
FIG. 4A shows an upper installation position for contactless power transmission and/or data transmission.
Figure 4B:
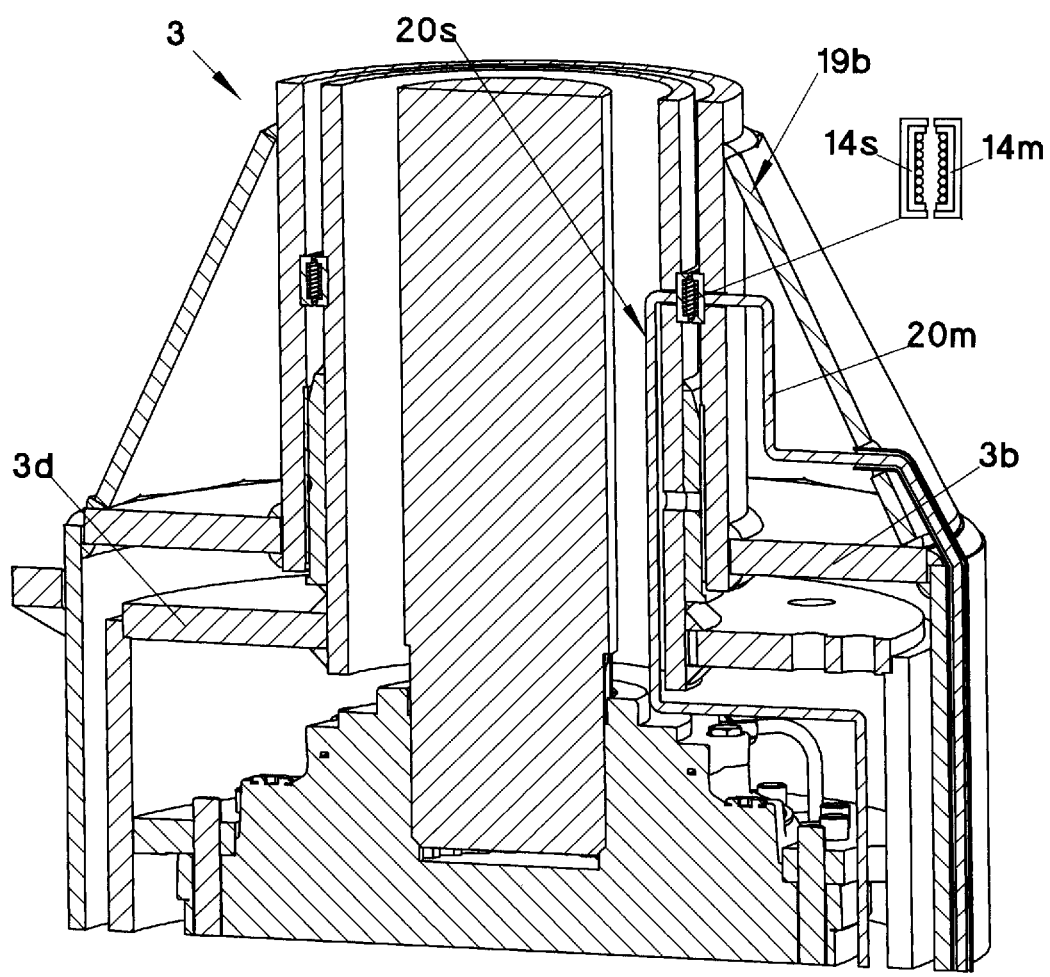
FIG. 4B shows a central installation position for contactless power transmission and/or data transmission.
Figure 4C:
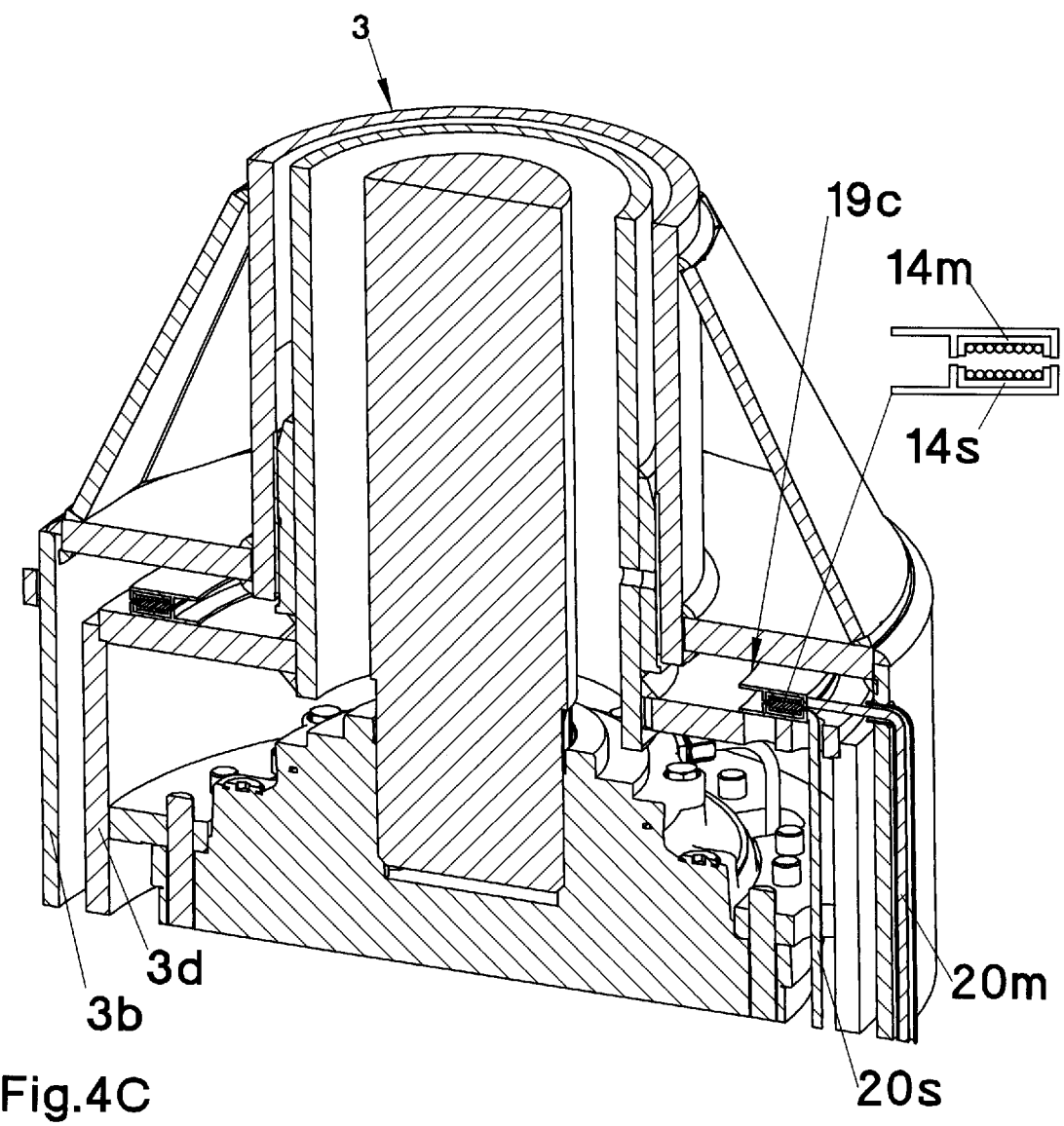
FIG. 4C shows a lower installation position for contactless power transmission and/or data transmission.

Suitable co-rotating and stationary structures for fastening inductive data transmission system 12 and/or power transmission system 13 have been omitted in FIG. 2 for the sake of clarity, but can be seen by way of example in FIGS. 4A to 4C.

The transmission of measurement and control data from/ to sensor system 5 among further not co-rotating components of fodder mixing wagon 1 can in principle take place wirelessly by radio or preferably by wiring, in particular via CAN bus 10.

The electrical supply power and the measurement and control data are transmitted among the co-rotating components of mixing member 3, preferably by way of conventional wiring. Associated cables can be attached, for example, to core tube 3*b* and mounting plate 3*c* and/or be routed in the cable ducts present there. For the sake of clarity, however, this is not shown in FIG. 2.

As an alternative to inductively resonant power transmission 14 from a not co-rotating current source, such as battery 15, an electric generator 16 is conceivable on the stator side and therefore also on the connection side arranged to co-rotate for the power supply of sensor system 5. Generator 16, for example, a friction wheel dynamo, can be wired to sensor system 5 in a relatively simple manner.

As is indicated schematically in FIG. 2, generator 16 can be coupled on the rotor side by way of a friction wheel 17 or the like substantially in a rotationally fixed manner to any not co-rotating structure of fodder mixing wagon 1, for example, to a core tube 3*b* of mixing member 3 (only indicated schematically in FIG. 2) arranged within and/or below bearing tube 3*d*, illustrated in FIG. 3. Friction wheel 17 can roll on a stationary circular path along a horizontal or vertical wall section of bearing tube 3*d* and thus drive the rotor of generator 16.

Since generator 16 can only supply sensor system 5 with electrical power when mixing member 3 is in rotation, a buffer battery 18 connected to generator 16 and arranged to co-rotate would also be conceivable for bridging downtimes.

Figure 3:
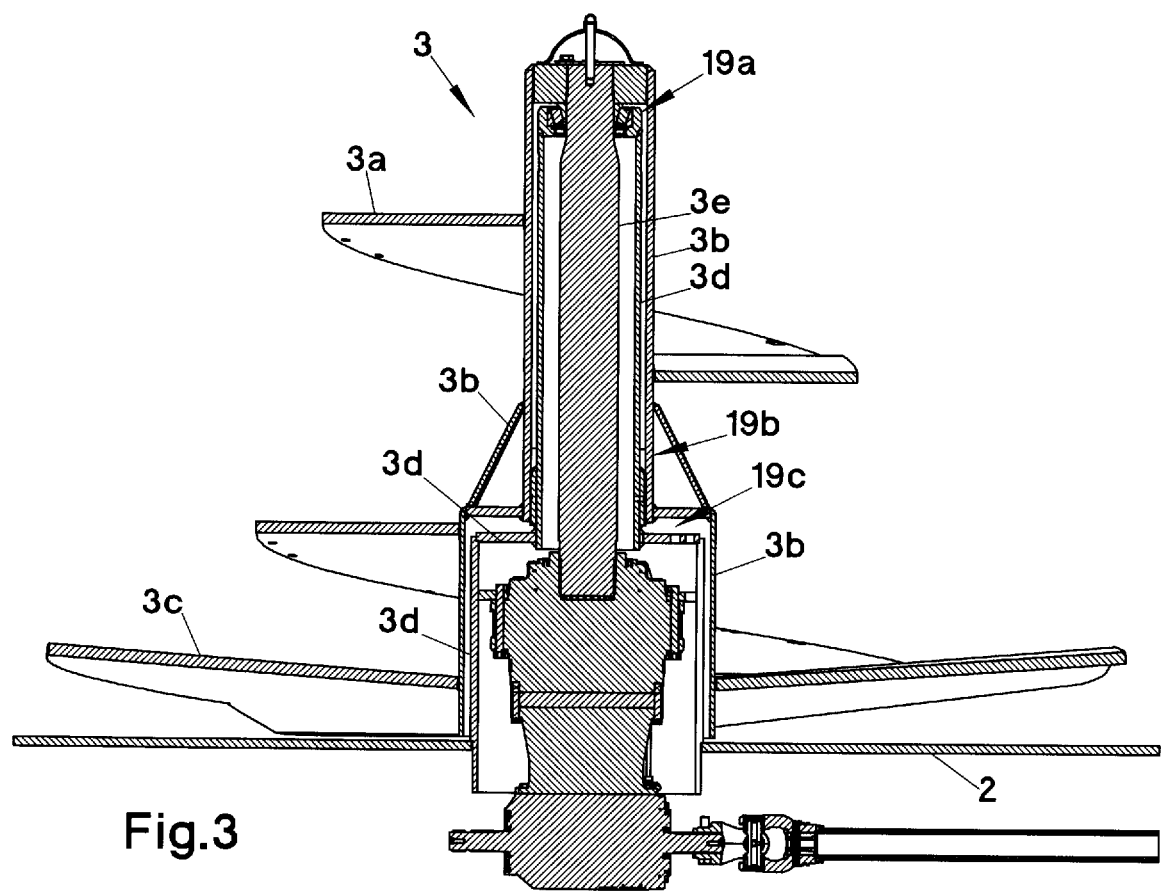
FIG. 3 shows an overview of preferred installation positions of power transmission systems operating inductively contactless.

FIG. 3 shows an overview of a possible configuration of mixing member 3 with regions designated by way of example for an upper installation position 19*a*, a central installation position 19*b* and a lower installation position 19*c* of stationary transmitter coil 14*s* and co-rotating receiver coil 14*m* for contactless power transmission 14 which can also be used for inductive data transmission 7, 8.

This is evident in detail from FIGS. 4A to 4C. For the sake of clarity, it is assumed in a simplified manner that both power transmission 14 as well as inductive data transmission 7, 8 take place via transmitter coil 14*s* and receiver coil 14*m*.

In principle, however, a separate pair of coils for inductive data transmission 7, 8 could also be arranged, for example, in the region of one of installation positions 19*a* to 19*c* shown. Unidirectional or bidirectional data transmission 7, 8 via radio would also be conceivable, i.e. a combination of inductive power transmission 14 and radio-supported data transmission 7, 8 (described above).

According thereto, stationary transmitter coil 14*s* is preferably attached to a horizontal or vertical wall section of stationary bearing tube 3*d*, and associated receiver coil 14*m* is attached to an oppositely disposed wall section of core tube 3*b* which on the other hand rotates outside and/or above. In this way, the transmitter and receiver coils 14*s*, 14*m* can be arranged at a suitable distance from one another with relatively little configuration effort and can also be mechanically shielded for their protection.

In addition, respective stationary wiring 20*s* of transmitter coil 14*s* and rotating wiring 20*m* of receiver coil 14*m* are additionally indicated.

Figure 5A:
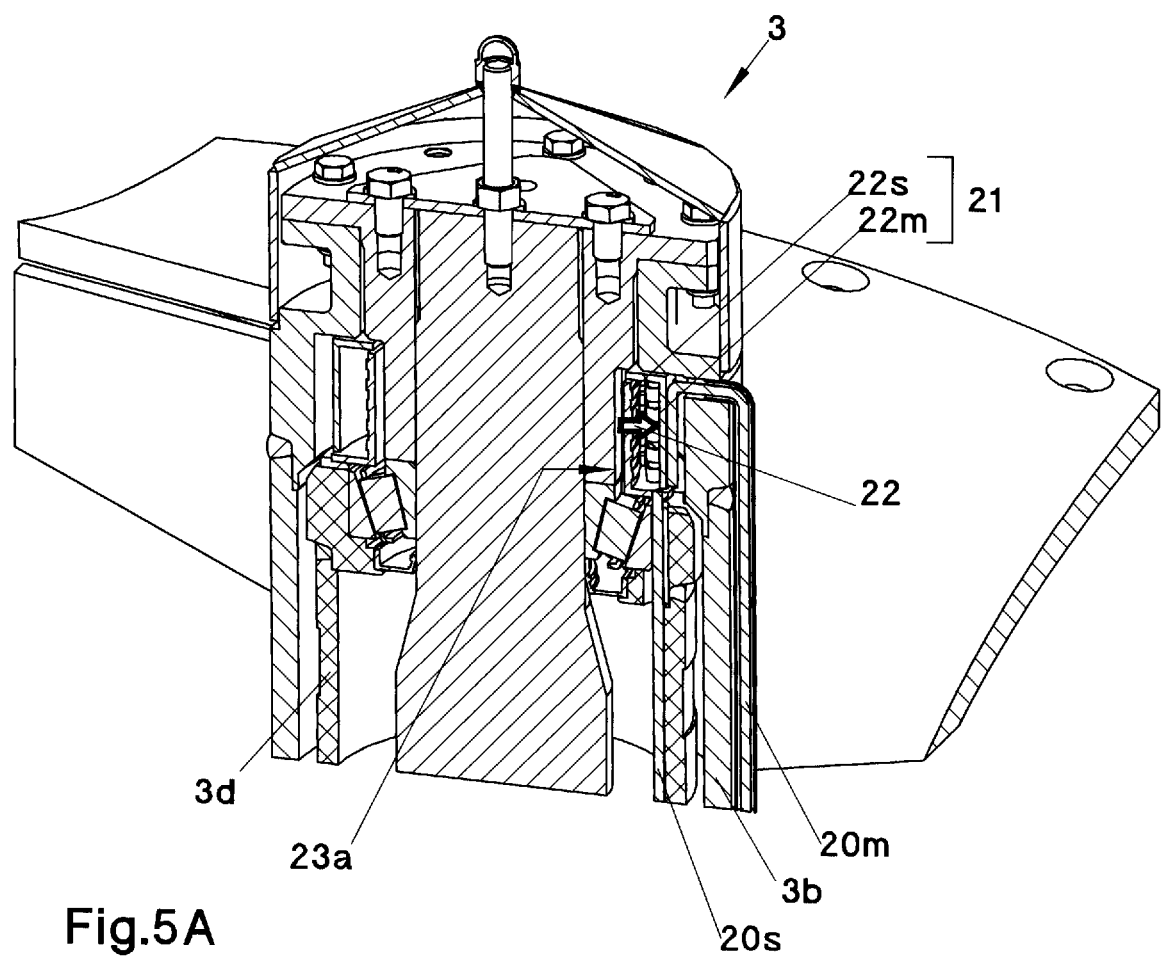
FIG. 5A shows an upper installation position for contacting power transmission and/or data transmission.

As an alternative to contactless power transmission 14 to sensor system 5, FIG. 5A shows a power transmission system 21 for contacting power transmission 22 by way of preferably stationary slip rings 22*s* and co-rotating runners 22*m* by way of example in an upper installation position 23*a*. With this known design principle, mechanical wear and maintenance of the corresponding contacts need to be accepted.

In principle, the slip rings 22*s* and runners 22*m* could also be used to transmit CAN bus signals with control commands, measurement data or the like, possibly also bidirectionally. This is conceivable in particular where sensor system 5 is supplied with power by generator 16 arranged to co-rotate.

Figure 5B:
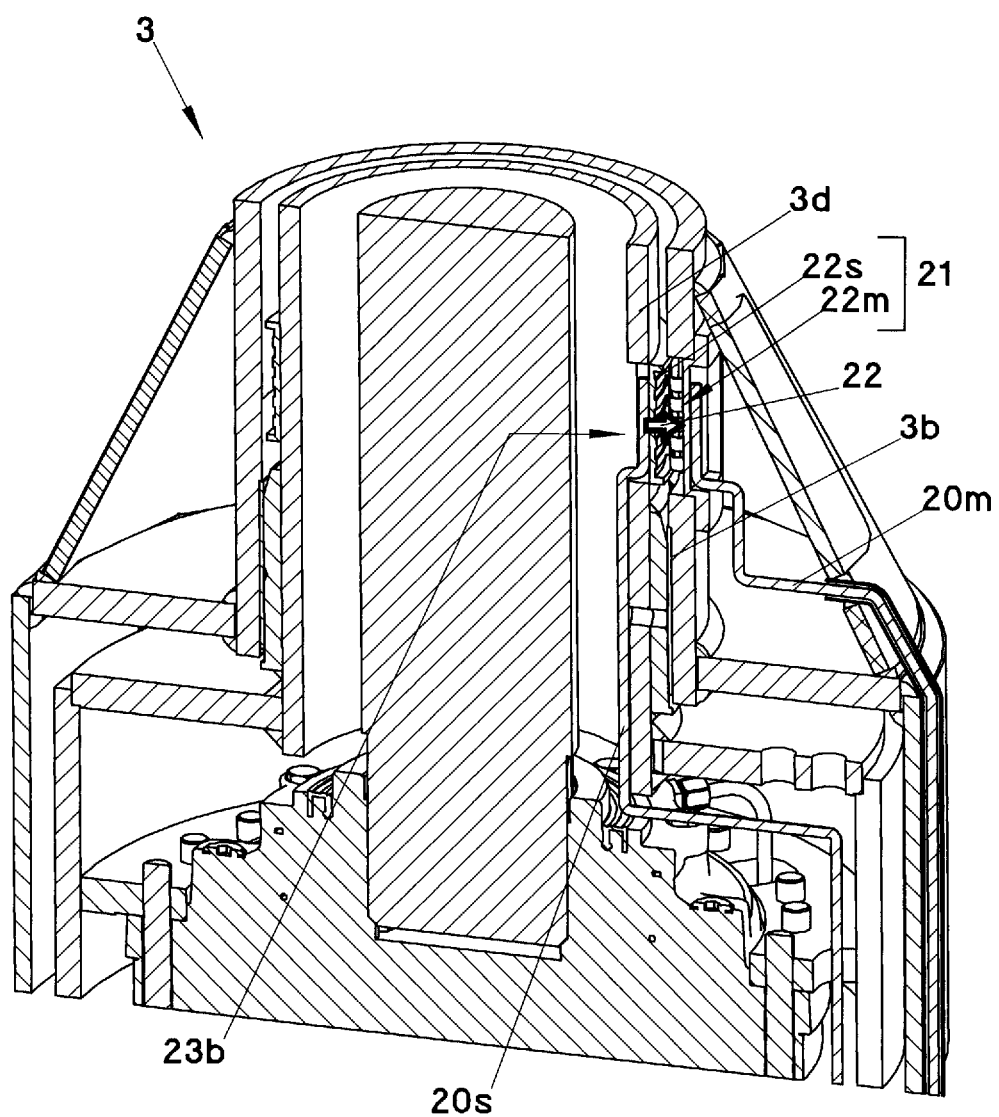
FIG. 5B shows a central installation position for contacting power transmission and/or data transmission.
Figure 5C:
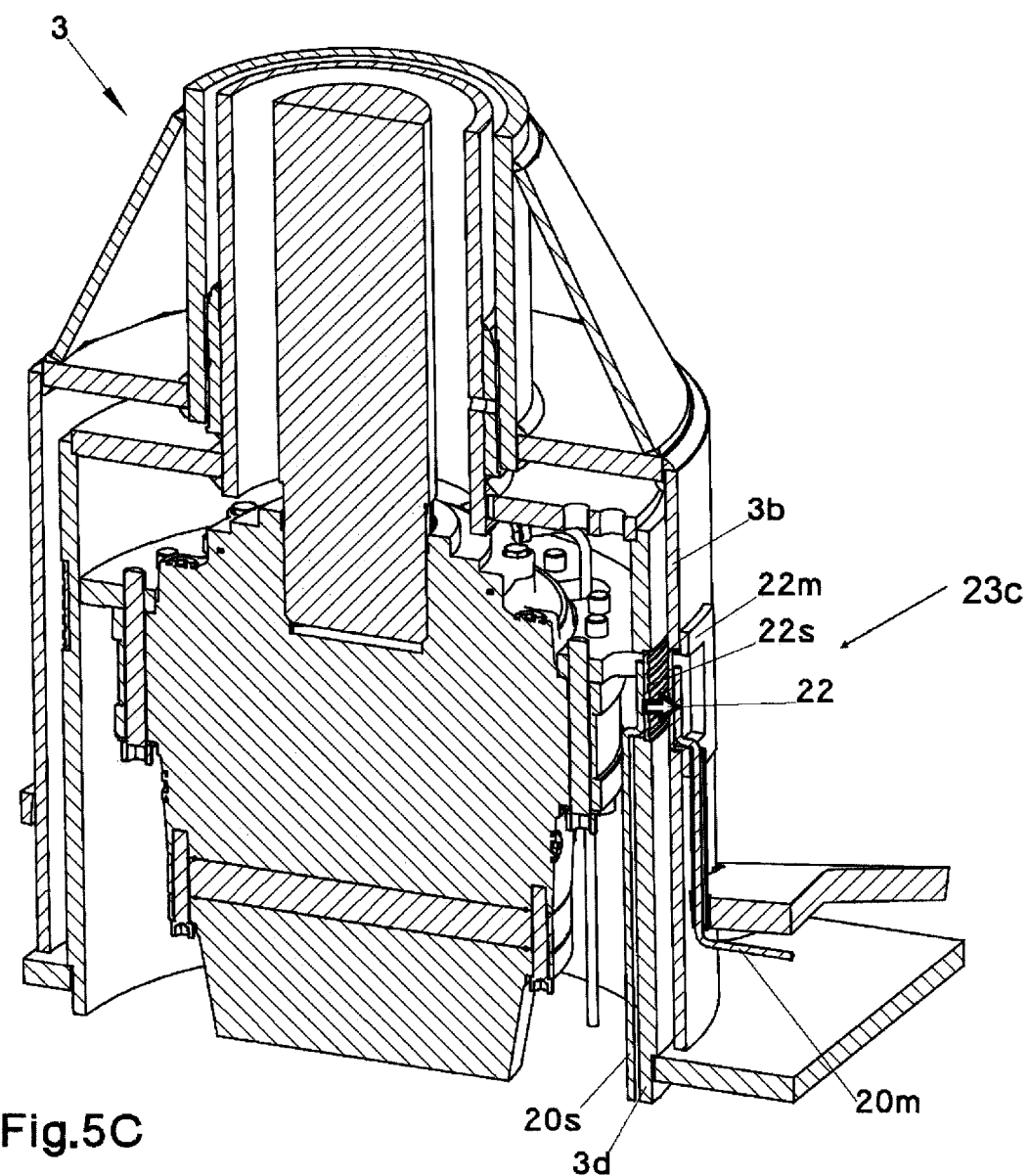
FIG. 5C shows a lower installation position for contacting power transmission and/or data transmission.

For better understanding, a central installation position 23*b* and a lower installation position 23*c* for power transmission system 21 with its slip rings 22*s* and runners 22*m* for contacting power transmission 22, or possibly also for contacting data transmission, are indicated by way of example in FIG. 5B. In addition, associated stationary wiring 20*s* and co-rotating wiring 20*m* are also shown.

In principle, data transmission of in particular evaluated measurement data from sensor system 5 and/or transmission of control data for sensor system 5 would also be possible in a contacting manner via associated slip rings 22s and runners 22m, for example, in the region of at least one of installation positions 23a to 23c.

Co-rotating wiring 20m of the coils or contacts can be routed relatively easily on the outer side of core tube 3b, for example, up to mounting plate 3c. Stationary wiring 20s can advantageously be routed on the inner side of bearing tube 3d.

As is evident from FIG. 3, mixing member 3 further comprises a central drive shaft 3e which is mounted coaxially in stationary bearing tube 3d. In principle, it would be conceivable to replace generator 16 (friction wheel dynamo) driven by friction wheel 17 with a generator having the structure of a hub dynamo. Its stator winding, which in this case also co-rotates, would be coupled for this purpose in a rotationally fixed manner to drive shaft 3e, the permanent magnet rotor then on the other hand to stationary bearing tube 3d. This would in principle be possible, for example, in the region of upper installation position 23a proposed for contacting power transmission 22.

Fodder mixing wagon 1 according to the invention can be employed, for example, as follows.

After switching on the electrical power supply of sensor system 5 by way of control device 11, a direct current flows from battery 15 to the stationary circuit part of power transmission system 13 or combined data and power transmission system 12, 13. It converts the direct current into an alternating current of, for example, 100 to 300 kHz, conducts the latter through transmitter coil 14s, whereby an alternating magnetic field is generated for inductive resonance coupling.

Associated receiver coil 14m converts the alternating field into alternating current which is finally rectified in co-rotating circuit part of power transmission system 13 or combined data and power transmission system 12, 13 and is supplied to sensor system 5 as direct current.

Furthermore, control signals from control device 11 within mixing container 2 can be transmitted wirelessly by radio transmission and/or by inductive coupling to co-rotating sensor system 5 for the latter's initialization and/or continuous adaptation.

Sensor system 5 is preferably selectively adjusted in this way for subsequent control measurements of individual fodder components and/or fodder mixtures 4 produced in mixing container 2.

Sensor system 5 preferably operates on the basis of an optical sensor 5a which is sensitive in particular in the near infrared (NIR) range and which when adding a fodder component to mixing container 2 is in close contact with the former or with fodder mixture 4 produced in fodder mixing wagon 1.

During the gradual addition of fodder components, the at least one mixing member 3 is set in rotation about itself in order to scan the fodder component and/or fodder mixture 4 produced therefrom as continuously as possible with the aid of sensor 5a and to record at least one property of the fodder component and/or fodder mixture 4 in the form of measurement data and make it available to control device 11. This is preferably done after evaluating individual measurement data in processing unit 5b of sensor system 5.

Data transmission 7, 8 of control data for sensor system 5 and/or of measurement data obtained with sensor system 5 and/or analysis data calculated therefrom in sensor system 5 can be carried out continuously wirelessly/contactlessly by radio and/or by inductive coupling to data transmission system 6, 12, i.e. by way of stationary/co-rotating pairs of transmitters and receivers arranged in the region of mixing container 2.

The evaluation of the measurement data in sensor system 5 on the basis of calibration data and evaluation algorithms stored there enables a particularly high processing speed and a particularly low susceptibility to errors. Only relatively small data packets are to be transmitted for every data record, for example, six files each having 2 kB. In principle, however, the evaluation of the measurement data would also be possible in control device 11 or in a cloud, in which, for example, calibration lines and algorithms can be stored. The data is processed in an adaptation program which is preferably stored or running in control device 11.

Processing the measurement data can proceed, for example, as follows. The measurement data is preferably analyzed in processing unit 5b of sensor system 5. However, this is also possible in control device 11 which is, for example, a component of a weighing system, or in the cloud. The analyzed data is contained, for example, in six files of 2 kB each and is compared in control device 11 in the sense of actual values with target values stored there. They are known from the weighing system and fodder management software.

The further procedure, i.e. in particular which quantities of which type of fodder is to be added, is determined by the adaptation program within specified value ranges and process sequences. This is possible "online", but it is also possible, for example, to use the screen of a weighing computer to communicate with the user in which way fodder mixture 4 is to be completed. For example, it can be communicated whether an additional type of fodder is to be added and whether its amount needs to be adjusted. This can apply both to fodder mixture 4 currently to be produced as well as to fodder mixtures 4 that is subsequently still to be produced.

The control signals/measurement data are/is preferably transmitted to a CAN interface 9 that is arranged on fodder mixing wagon 1 not to co-rotate and a CAN bus 10 to control device 11 of fodder mixing wagon 1. The measurement data can be analyzed there and transferred to an external analysis system or to a smartphone or a cloud, respectively, and be used for further control of the mixing process.

For this purpose, control device 11 can transmit control data, control commands or the like to the stationary transmitter of data transmission system 6, 12 via CAN bus 10 and CAN interface 9 in order to wirelessly transmit the control data, control commands from there to the co-rotating receiver of data transmission system 6, 12. From there, the control data/control commands can be forwarded to co-rotating sensor system 5 by way of conventional wiring. As a result, the measurement data acquisition and/or a measurement data evaluation in sensor system 5 can possibly be selectively adapted to new circumstances, for example, to the properties to be expected of a newly admixed fodder component.

This means that the mixing process is constantly monitored and adjusted while at the same time disturbance-resistant and efficient wireless data transmission 7, 8 by way of data transmission system 6, 12 is effected. Data transmission 7, 8 can there take place bidirectionally by way of radio coupling and/or inductive coupling.

Wireless data transmission 7, 8 can be combined with inductively coupled power transmission 14 between a battery 15 and co-rotating sensor system 5, as well as with power generation directly on the co-rotating part of mixing member 3 by way of a generator 16 attached thereto on the stator side, but also with conventional contacting power transmission 22 between battery 15 and co-rotating sensor system 5 by way of slip rings 22s and runners 22m.

Depending on the embodiment, the different power transmission systems 13, 21 and/or the power generation on the co-rotating component of mixing member 3 can be arranged in different regions of core tube 3b, associated bearing tube 3d or possibly also in the region of drive shaft 3e.

Depending on the design, technical solutions are there possible that either work free of wear or at least enable comparatively easy access to the components subject to wear.

Like a generator 16 arranged on the co-rotating part of mixing member 3, data transmission systems 6, 12 and power transmission systems 13, 21 can also be used flexibly on fodder mixing wagons 1 in which several mixing members 3 and possibly also several co-rotating sensor systems 5 are present in mixing container 2.

Particularly advantageous is a combination of data transmission system 12 and power transmission system 13 in a common transmission system which uses the transmitter and receiver coil 14s, 14m both for wireless data transmission 7, 8 as well as for contactless power transmission 14.

A suitable number of stationary data interfaces on mixing container 2 can be networked easily using CAN bus 10, so that flexible monitoring and controlling of mixing processes is possible with comparatively little effort.

CAN messages with control commands, analysis data or the like could basically also be transmitted in a contacting manner with slip rings 22s and runners 22m, possibly also bidirectionally. This is particularly practical if the power supply is provided by a generator 16 that is arranged to co-rotate.

While the present invention has been described with respect to several different embodiments, it will be obvious that various modifications may be made without departing from the spirit and scope of this invention.

What is claimed is:

1. A fodder mixing wagon comprising: a mixing container and at least one mixing member arranged rotatable therein for fodder components; at least one sensor system arranged to co-rotate on said mixing member for examining at least one of the fodder components and/or a fodder mixture formed therefrom; a power transmission system comprising at least one transmitter coil and at least one receiver coil for inductively resonant power transmission to said sensor system; and a data transmission system with at least one transmitter and at least one receiver which are associated with one another in a co-rotating and not co-rotating arrangement for wireless data transmission to and/or away from said sensor system, wherein said transmitter and receiver are arranged such that said wireless data transmission therebetween them takes place entirely within said mixing container.

2. A fodder mixing wagon according to claim 1, further comprising a power transmission system comprising slip rings for contacting electrical power transmission to said sensor system.

3. A fodder mixing wagon according to claim 1, further comprising an electrical generator for supplying power to said sensor system, where said generator is arranged on a stator side to co-rotate with said mixing member and on a rotor side is coupled not to co-rotate.

4. A fodder mixing wagon according to claim 1, where said transmitter and said receiver are configured for contactless bidirectional data transmission by an inductive coupling.

5. A fodder mixing wagon according to claim 1, wherein said transmitter and said receiver are configured for contactless bidirectional data transmission by way of radio signals.

6. A fodder mixing wagon according to claim 1, further comprising a control device with a CAN bus and at least one CAN interface for connecting said wireless data transmission system to said CAN bus.

7. A fodder mixing wagon comprising: a mixing container and at least one mixing member arranged rotatable therein for fodder components; at least one sensor system arranged to co-rotate on said mixing member for examining at least one of the fodder components and/or a fodder mixture formed therefrom; a power transmission system comprising at least one transmitter coil and at least one receiver coil for inductively resonant power transmission to said sensor system; and a data transmission system with at least one transmitter and at least one receiver which are associated with one another in a co-rotating and not co-rotating arrangement for wireless data transmission to and/or away from said sensor system, wherein said transmitter and receiver are arranged such that said wireless data transmission therebetween them takes place predominantly within said mixing container, and where said data transmission system is configured such that said data transmission system uses said at least one transmitter coil and said at least one receiver coil of said power transmission system for at least unidirectional or bidirectional data transmission by modulating an alternating field generated by said transmitter coil.

8. A fodder mixing wagon comprising: a mixing container and at least one mixing member arranged rotatable therein for fodder components; at least one sensor system arranged to co-rotate on said mixing member for examining at least one of the fodder components and/or a fodder mixture formed therefrom; and an electrical generator for supplying power to said sensor system, wherein said electric generator is arranged on a stator side to co-rotate with said mixing member and a rotor side is coupled not to co-rotate.

9. A fodder mixing wagon according to claim 8, where said generator is a friction wheel dynamo that rolls along a not co-rotating part of said mixing container.

10. A fodder mixing wagon according to claim 8, further comprising a data transmission system with at least one receiver and at least one transmitter which are associated with one another in a co-rotating and not co-rotating arrangement for wireless data transmission to and/or away from said sensor system and are arranged so that said wireless data transmission therebetween takes place predominantly within said mixing container.

11. A fodder mixing wagon according to claim 10, where said transmitter and said receiver are configured for contactless bidirectional data transmission by inductive coupling.

12. A fodder mixing wagon according to claim 10, where said transmitter and said receiver are configured for contactless bidirectional data transmission by way of radio signals.

13. A fodder mixing wagon according to claim 8, further comprising a data transmission system with slip rings and runners which are associated with one another in a not co-rotating and co-rotating arrangement for contacting data transmission to and/or away from said sensor system.

* * * * *